United States Patent [19]

Van Order et al.

[11] Patent Number: 5,205,635
[45] Date of Patent: * Apr. 27, 1993

[54] VEHICLE ACCESSORY BODY AND INTEGRAL CIRCUIT

[75] Inventors: Kim L. Van Order, Hamilton; Nels R. Smith, Holland, both of Mich.

[73] Assignee: Prince Corporation, Holland, Mich.

[ * ] Notice: The portion of the term of this patent subsequent to Feb. 25, 2009 has been disclaimed.

[21] Appl. No.: 688,913

[22] Filed: Apr. 19, 1991

Related U.S. Application Data

[63] Continuation-in-part of Ser. No. 548,024, Jul. 5, 1990, Pat. No. 5,091,831.

[51] Int. Cl.$^5$ ............................................. B60Q 3/00
[52] U.S. Cl. ...................................... 362/83.1; 362/135
[58] Field of Search ............... 362/61, 74, 135, 83.1, 362/83.3, 142, 144, 140, 141; 296/97.5, 214, 37.7

[56] References Cited

U.S. PATENT DOCUMENTS

| | | | |
|---|---|---|---|
| 3,936,131 | 2/1976 | Durand | 339/128 |
| 4,000,404 | 12/1976 | Marcus | 240/2 R |
| 4,171,864 | 11/1979 | Viertel et al. | 296/97 H |
| 4,213,169 | 7/1980 | Kemphers . | |
| 4,271,408 | 6/1981 | Teshima et al. | 340/702 |
| 4,592,615 | 6/1986 | Durand | 339/176 L |
| 4,607,901 | 8/1986 | Durand | 339/59 L |
| 4,624,523 | 11/1986 | Durand | 339/176 L |
| 4,624,524 | 11/1986 | Durand | 339/176 L |
| 4,630,880 | 12/1986 | Durand | 339/176 L |
| 4,720,272 | 1/1988 | Durand | 439/375 |
| 4,744,645 | 5/1988 | Sharp | 350/631 |
| 4,783,110 | 11/1988 | Buekema et al. | 296/37.7 |
| 4,893,867 | 1/1990 | Hilborn et al. | 296/214 |
| 5,055,982 | 10/1991 | Johnson | 362/61 |
| 5,091,831 | 2/1992 | Van Order et al. | 362/74 |

FOREIGN PATENT DOCUMENTS 3523911  1/1987  Fed. Rep. of Germany .
3804362  8/1989  Fed. Rep. of Germany .

Primary Examiner—Richard R. Cole
Attorney, Agent, or Firm—Price, Heneveld, Cooper, DeWitt & Litton

[57] ABSTRACT

A vehicle member is defined by a body which includes a substrate having an insulative layer and a pair of spaced conductors extending to define terminals for receiving an electrical component which is attached to the body to engage the conductors for providing activating power to the component. In a preferred embodiment, the member is a visor and the component an illuminated vanity mirror package. In one embodiment, the vanity mirror is mounted to the visor body using interlocking posts and keyhole-shaped apertures.

15 Claims, 3 Drawing Sheets

VEHICLE ACCESSORY BODY AND INTEGRAL CIRCUIT

CROSS REFERENCE TO RELATED APPLICATIONS

This is a continuation-in-part application of U.S. patent application Ser. No. 07/548,024, filed Jul. 5, 1990, and entitled VEHICLE FOIL LAMINATED LAMP MOUNT now U.S. Pat. No. 5,091,831, the disclosure of which is incorporated herein by reference

BACKGROUND OF THE INVENTION

The present invention pertains to a structure for mounting a lamp or other electrical accessory in a vehicle body which integrally includes an electrical circuit.

Presently, the overhead lamps installed in vehicle headliners and the like typically employ a housing mounted to the vehicle itself into which the lamp (i.e. bulb) and its socket and switching components are mounted. The assembly typically includes a trim bezel which may include lenses, diffusers, or the like. Power for such accessories is usually supplied through discrete wiring harnesses extending between the vehicle headliner and roof. Visors also frequently include electrical accessories such as illumination means for a vanity mirror, garage door opening transmitters, telephones, or other electrical accessories. Typically the visor has a body which is molded or formed of either a polymeric material or of a fiberboard material. The electrical components typically have been coupled by discrete conductors such as physical wires or stamped flat circuit conductors which are held to the visor core in a conventional manner. U.S. patent application Ser. No. 07/350,596, filed on May 11, 1989 and entitled LIGHTED MIRROR ASSEMBLY FOR MOTOR VEHICLE VISOR discloses an electrical circuit mounted on the rear surface of a visor illuminated vanity mirror, which circuit is printed with a conductive ink on a Mylar film adhesively attached to the back of the mirror. The mirror is then incorporated in a conventional fashion to a vehicle visor body such as a molded core member.

In recent years, headliners for vehicles have also included electrical wiring harnesses which are attached to the headliners using additional fasteners which route the wiring harness to a variety of sockets for the electrical accessories mounted to the headliner. The headliner assembly is then mounted to the vehicle roof and an interconnecting wire harness in the vehicle is connected to one or more of the harnesses associated with the headliner. Such construction, although simplifying the installation process, still requires the utilization of a lamp housing and associated hardware including, electrical harnesses, typically in a bundle of wires which include connectors at opposite ends for coupling the modular housing to the vehicle's electrical system as the headliner is installed.

SUMMARY OF THE INVENTION

The system of the present invention overcomes the complexity of the installation and construction of vehicle accessories which require electrical operating power for electrical accessories associated therewith. Thus, the system of the present invention allows for the integration of the body structure of the vehicle accessory with its electrical circuit for providing operating power or electrical signal conduction for electrical accessories mounted to the body structure such as a visor body, headliner, or any other vehicle structural member which may require electrical operating power or electrical signal conductors. By integrating the structure forming the vehicle accessory body with electrical conductors, conventional wire harnesses or other separate circuit forming means is eliminated and the overall cost, weight and efficiency of the construction and operation of the resultant device is greatly improved. In one embodiment of this invention, the vehicle accessory body is molded of a substrate including a suitable insulating material shaped in the form of the vehicle accessory and integrally laminated with an electrical foil layer which is configured to define an electrical circuit for the vehicle accessory. The circuit extends to one or more locations on the substrate and defines terminals for receiving electrical components.

According to another embodiment of the invention, a vehicle visor or other vehicle accessories include an accessory package mounted thereto by means of a plurality of keyhole-shaped apertures formed on one of the accessory body and accessory package and a plurality of mounting posts formed on the other of said accessory body and package such that said accessory package can be mounted to said accessory body by insertion of said posts into said keyhole-shaped apertures and translating said package to a locked position.

The system of the present invention therefore overcomes the complexity of the installation of electrical components or other accessory packages on a vehicle accessory by providing a substrate made of an insulating material which integrally includes a conductive material formed in a circuit pattern on one side of the substrate and terminating in terminals at various locations on the accessory body for receiving electrical components. In a preferred embodiment of the invention, the vehicle accessory is a visor body having a core formed of an insulative material laminated with a foil material pattern to provide at least positive and negative conductive terminals terminating in spaced relationship to one another at opposite sides of an illuminated vanity mirror package visor body. Lamp means are mounted to a housing secured to the visor body and engage the terminals of the foil for supplying operating power to the lamps directly from the foil conductors forming part of the visor body. The foil material serves not only to supply electrical operating power to the lamps but also to reflect light from the lamps and provide a heat sink for drawing heat away from the lamp area for dissipation within the visor. In another embodiment of the invention, the visor body or other vehicle accessory body includes a pair of laminated conductors terminating in a notched edge thereof and a lamp includes a holder which fits over the edge of a substrate for engaging the conductors for supplying operating power to the lamp.

With such a system, vehicle accessories and the wiring associated with such an accessory can be integrated into a single structural unit to reduce the cost of manufacturing, the ease of assembly, and the reliability of operation over a period of time. These and other features, objects and advantages of the present invention will become apparent to those skilled in the art upon reading the following description thereof together with reference to the accompanying drawings in which:

DETAILED DESCRIPTION OF THE PREFERRED EMBODIMENT

Figure 1:
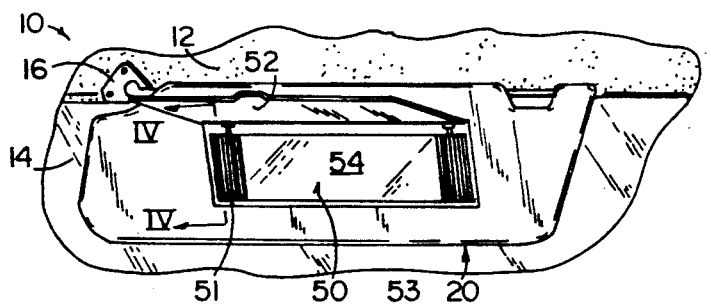
FIG. 1 is a fragmentary perspective view of the vehicle visor embodying the present invention.

Referring initially to FIG. 1 there is shown a portion of a vehicle 10 such as an automobile and particularly a roof area 12 located above the front windshield 14. Illustrated is the portion of the passenger side of the vehicle which shows the installation of an illuminated vanity mirror visor 20 therein which is mounted to the roof 12 by means of an elbow bracket mounting assembly 16 including a visor pivot rod 18 (FIG. 2) which extends within the body of the visor 20. This construction allows the visor to pivot along a generally horizontal axis between a lowered use position as illustrated in FIG. 1 and a stored position against the vehicle roof 12 when not in use. The visor assembly 20 includes an illluminated vanity mirror package 50 having a pivoted cover 52 thereon for selectively covering the vanity mirror 54. Mirror 54 is selectively illuminated upon opening of the cover by a pair of illumination means including lenses 51 and 53 on the left and right sides of mirror 54 respectively. Cover 52 pivots between an open position shown in FIG. 1 exposing the mirror 54 which is automatically illuminated by the actuation of the cover to provide illumination for use of the mirror by the passenger in the embodiment shown and which can be closed to cover the mirror and lenses and extinguish the lamps associated therewith when not in use. Having briefly described the overall construction of the visor 20, a detailed description first of the visor core and circuit is presented followed by a description of the illuminated vanity mirror package which cooperates with the visor core.

Figure 2:
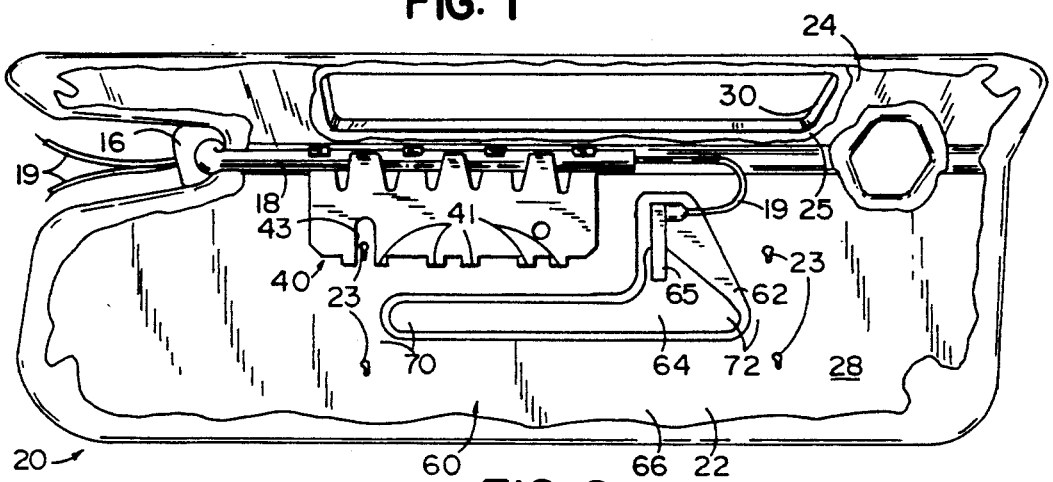
FIG. 2 is a front elevational view of the visor shown in FIG. 1 with the mirror package removed and the visor body partially opened showing the electrical circuit formed therein.

The body of visor 20 is of a folded core construction in which the core is made of a substrate 27 of fiberboard material defining a first or rear core half 22 and a second or front core half 24 which are integrally joined along a hinge line 25 (FIG. 2). The inside of the core has a conductive layer 28 such as aluminum foil laminated to the substrate and is formed to define an electrical circuit 60 as described below. The substrate material is fiberboard in the preferred embodiment but can be any number of molded polymeric materials such as polypropolene or the like to form the substrate 27 to which the conductive layer 28 is bonded by a suitable adhesive such as a polyvinyl acetate (PVA) 29 shown in FIG. 4. In one embodiment of the invention, the body or core of visor 20 is molded of a fiberboard substrate having a thickness of approximately 0.080 inches with a foil layer 28 having a thickness of approximately from 0.00025 to 0.005 inches. The composite fiberboard and conductive material bonded thereto is commercially available from Fiber Converters Inc., and can be press-formed into the desired three-dimensional die out shape of the visor body as illustrated in FIG. 2.

The visor 20 includes a central recess 30 in the front or second side 24 of the visor panel for exposing an illuminated vanity mirror package 50 which is attached directly to the rear panel 22 of the visor core. The visor body also includes a suitable upholstery covering 21 which typically comprises a foam-backed upholstery having a color and texture conforming to the vehicle interior. Upholstery material 21 is attached to the visor core by wrapping around the peripheral edges of the visor core as illustrated in FIG. 2 and subsequently closing the visor core halves together and bonding them to form the completed visor in a manner described in U.S. Pat. No. 4,570,990.

Figure 3:
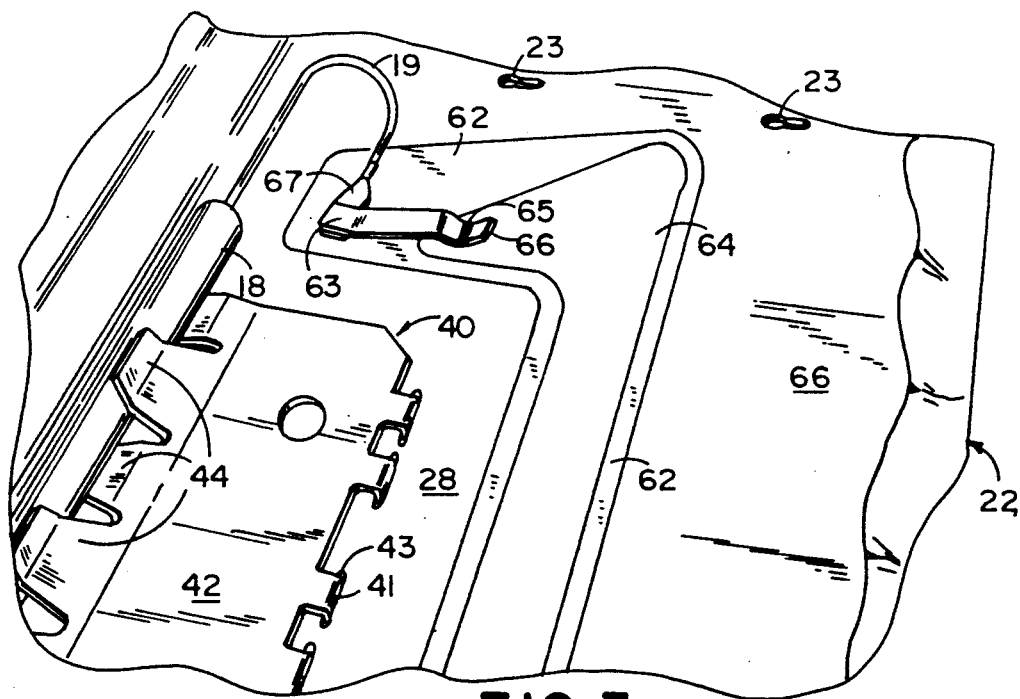
FIG. 3 is an enlarged fragmentary perspective view of a portion of the visor body shown in FIG. 2.

Extending within the visor core is visor pivot rod 18, as seen in FIGS. 2 and 3, which communicates with a visor torque control 40 which is generally of the type disclosed in U.S. Pat. No. 5,004,289. Control 40 has a planar body 42 with a plurality of tabs 41 extending from the lower edge thereof which extends into slots 43 formed in core half 22 for mounting the torque fitting 40 thereto. The planar body 42 includes a clearance slot 43' (FIG. 2) for access to one of four keyhole-shaped apertures 23 formed in core half 22 for mounting the illuminated vanity mirror package thereto as described below. Alternately staggered arms 44 of torque fitting 40 extend on opposite sides and engage alternately staggered flats and round sections of the hollow visor pivot rod 18 for urging and holding the visor in either a raised stored position or a lowered use position. Rod 18 includes an electrical conductor 19 extending therethrough from the elbow bracket assembly 16 for the application of electrical operating power to the illuminated vanity mirror assembly 50 through the electrical circuit 60 formed on the interior of the visor body.

Circuit 60 is formed by the configuration of the foil layer 28 on substrate 27 as best seen in FIGS. 2 and 3. Referring now to those figures, it is seen that the visor body initially includes a foil layer 28 over its entire inner surface. A circuit pattern is scribed in the foil layer and foil material selectively removed for the purpose of defining the electrical circuit for a given application. In the embodiment shown in which only two conductors are required, a generally L-shaped raceway of foil material is removed to expose the bare fiberboard material in the area 62 shown in FIGS. 2 and 3. This defines a center island 64 of conductive material isolated from the remaining conductive area 66 of the visor body. Area 66, which comprises the largest part of the body, comprises the negative or ground conductor for the lamps associated with the illuminated vanity mirror as described below. Area 66 is coupled to the vehicles ground system through the metallic and therefore conductive torque fitting 40 in part through the interconnection of tabs 41 against the conductive material 28 forming area 66. This area, as well as center area 64, serves as a light reflector to reflect light from lamps 76 and 78 (FIG. 5) through lenses 51 and 53 as well as dissipate heat from the lamps. The visor pivot rod 18 is electrically coupled to the arms 42 and 44 of member 40 and is electrically connected to the vehicle sheet metal roof through the visor elbow bracket 16 typically including metal screws or the like through a grounding strap contacting member 18. If a metal bracket 16 is used, such additional grounding is unnecessary.

The center island 64 of the electrical circuit 60 is selectively coupled through a deflectable switch contact arm 66 which has one end 63 physically mounted to insulated area 62 of the visor core member 22 and includes a curved contact end 66 which extends over the end 65 of center island 64 and is spaced therefrom in a non-contacting position with the cover 52 in a closed position. The end 63 of contact 66 is coupled to conductor 19 by a suitable clip fastener 67. When cover 52 is opened, cam 68 (FIG. 5) urges contact 66 into engagement with end 65 of center island 64 to apply the positive supply voltage to island 64. Island 64 is shaped to extend across a substantial width of the recess 30 into which the illuminated vanity mirror package 50 is fitted to provide circuit terminal locations shown at areas 70 and 72 in FIG. 2 for the coupling of cartridge type lamps thereacross for selectively receiving operating power by the contact of each of the lamps with one terminal being coupled to the positive island conductor 64 and the remaining terminals coupled to the ground section 66 of the circuit 60 formed by the visor body.

Figure 5:
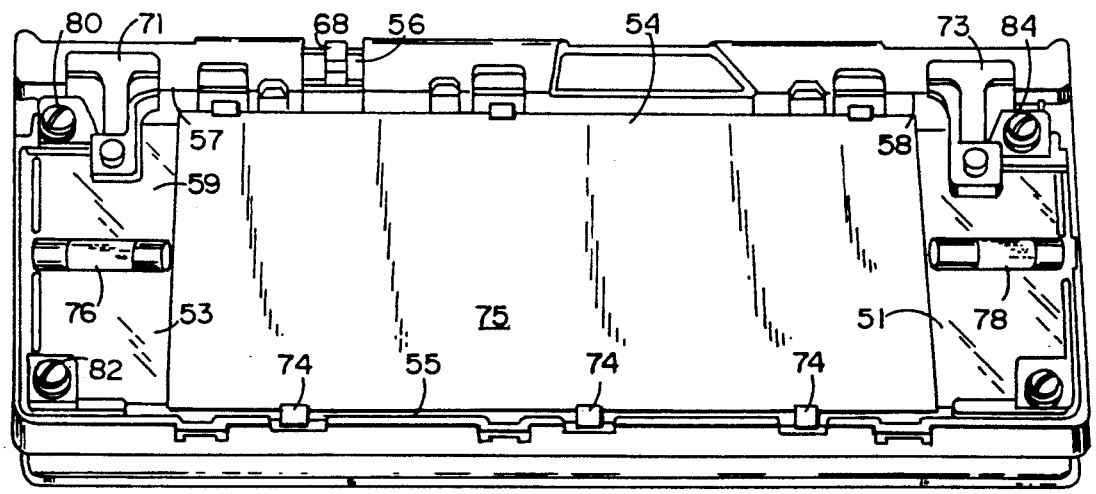
FIG. 5 is a rear plan view of the illuminated vanity mirror package for the visor shown in FIG. 1.
Figure 6:
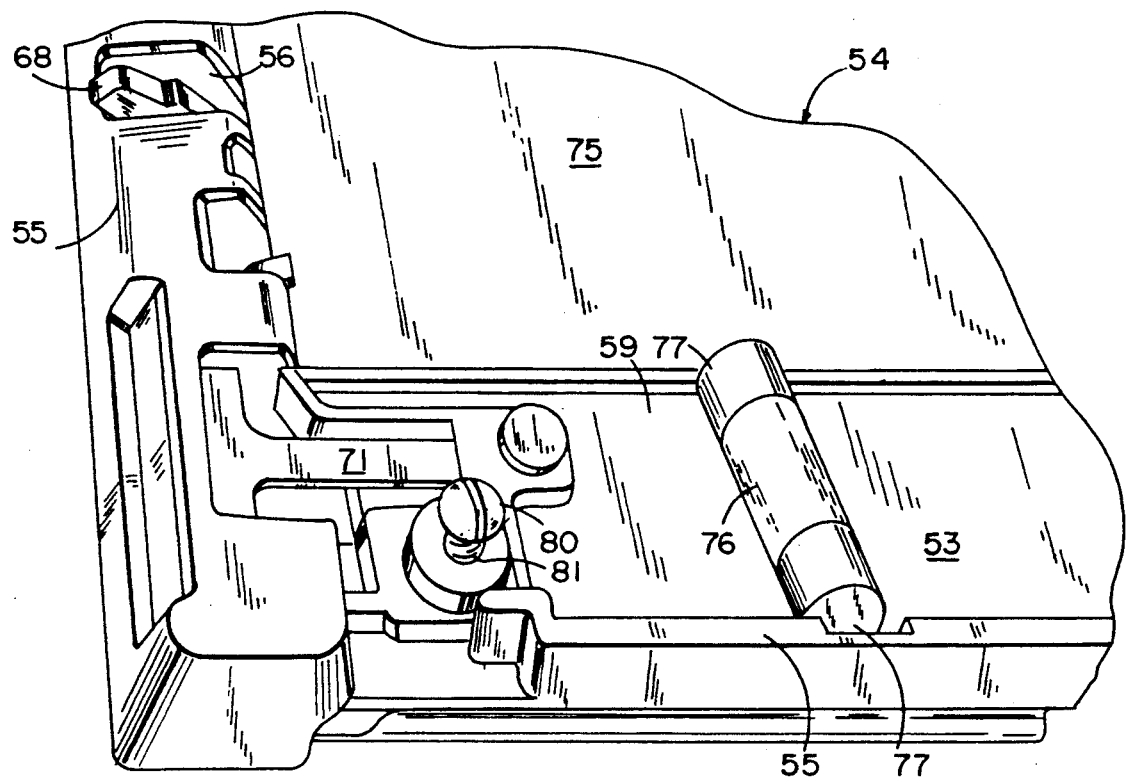
FIG. 6 is an enlarged fragmentary perspective view of the upper left corner of the structure shown in FIG. 5.
Figure 4:
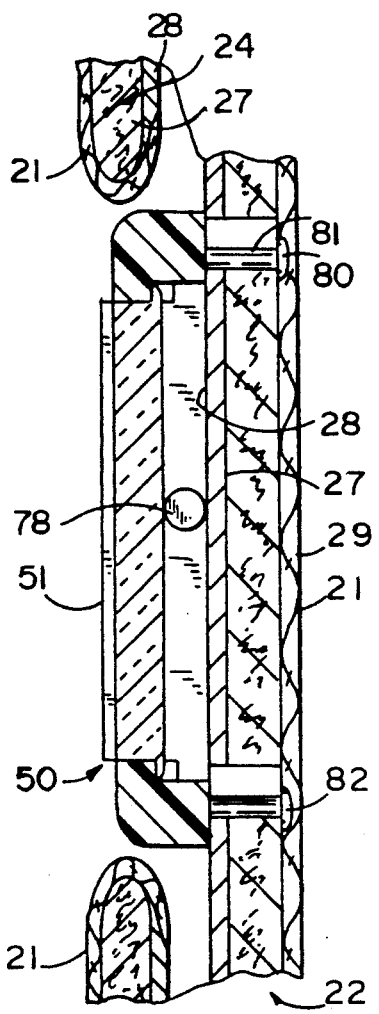
FIG. 4 is an enlarged fragmentary cross-sectional view of the visor shown in FIG. 1 taken along section line IV—IV of FIG. 1.

Thus, the switch contact 66, which is in the shape of a spring arm of conductive material such as beryllium copper or the like, is actuated by a cam member 68 (FIGS. 5 and 6) extending from an edge of cover 52 such that when the cover is open, cam 68 engages arm 65 pushing downwardly into engagement with island 64 for applying positive operating power from conductor 19 to the island 64 for activating the lamps associated with the vanity mirror package and in contact with lamp terminals 70 and 72 as now described in connection with FIGS. 4-6.

The illuminated vanity mirror package 50 has a frame and cover construction which is substantially identical to the mechanical structure disclosed in U.S. Pat. No. 4,760,503, the disclosure of which is incorporated herein by reference. Briefly, however, the illuminated vanity mirror package 50 includes a generally rectangular frame 55 which as best seen in FIG. 5 includes a recess 56 along its top edge through which the cam 68 on the upper edge of cover 52 extends for activating spring contact arm 65 when the illuminated vanity mirror package is mounted to the core half 22. Frame 55 also includes configured apertures 57 and 58 at opposite ends for receiving generally T-shaped bias springs 71 and 72 for urging the cover, which is pivotally mounted to the frame as described in the above identified patent, between a snap-opened and a snap-closed position. The lenses 51 and 53 are mounted within frame 55 by snap fittings or other conventional means and include a boarder subframe 59 extending around each of the lenses for such purpose. The mirror 54 is mounted within the rectangular central opening defined by frame 55 and is held therein by heat stake tabs 74 spaced around the periphery for securely holding the mirror and its protective adhesive and foam backing member 75 to the illuminated vanity mirror package.

Mounted to the subframes 59 for each of the lenses 51 and 53 are cartridge-type lamps 76 and 78 respectively which preferably are positioned centrally behind each of the lenses 51 and 53 such that illumination from the filament of each of the lamps 76 and 78 are focused efficiently by the lenses. In the embodiment shown in FIGS. 5 and 6, each of the commercially available cartridge-type lamps or bulbs have conductive ends 77 bonded to the polymeric frames 59 by a suitable bonding adhesive. The frames 59 likewise could include a semicircular snap-in socket for receiving the ends of the cartridge bulbs if desired. This placement of cartridge-type lamps 76 and 78 aligns them with the electrical lamp terminals 70 and 72 shown in FIG. 2 defined by the circuit formed on visor panel 22 such that when the vanity mirror assembly 50 is attached to the visor panel, the opposite end contacts each of the bulbs are mechanically and electrically coupled to the spaced pairs of terminals 70 and 72 defined by the visor circuit for supplying electrical operating power to the lamps when the cover 52 is open.

For purposes of mounting the illuminated vanity mirror package 52 to the visor panel 22, four mounting posts 80, 82, 84 and 86 are provided at the approximate four corners of frame 55. Each of the posts include, as best seen in FIG. 6, an enlarged head spaced from the surface of frame 55 by an outwardly extending stem 81. The four mounting posts extend into the keyhole-shaped apertures 23 which have a pattern and location corresponding to that of the mounting posts such that the illuminated vanity mirror can be pushed within the enlarged circular tops of the keyhole-shaped apertures and then translated by sliding downwardly into the narrowed lower sections of the apertures. At the same time, the electrical contact ends 77 of each of the cartridge bulbs 76 and 78 are compressed into engagement with their associated terminals 70 and 72 respectively. The illuminated vanity mirror package 50 is mounted to the rear visor panel 22 when in an open position as shown in FIG. 2 with the panels then subsequently being closed and bonded to complete the assembly of the visor.

When cover 52 is opened, cam 68 engages spring arm 65 applying positive operating power from conductor 19 leading to the vehicle's power supply system to the island or positive terminal 64 of the electrical circuit which provides a positive supply voltage to the inner terminals for each of lamps 76 and 78. The outer terminals of each of the lamps are coupled to the conductive section 66 of the electrical circuit 60 which as described above is ground and therefore provides a return current path for current illuminating the bulbs and therefore providing illumination for use of the illuminated vanity mirror visor.

Figure 8:
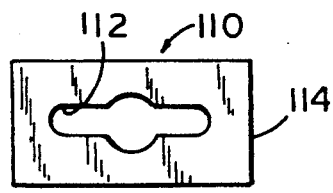
FIG. 8 is a front elevational view of the holder shown in FIG. 7.
Figure 7:
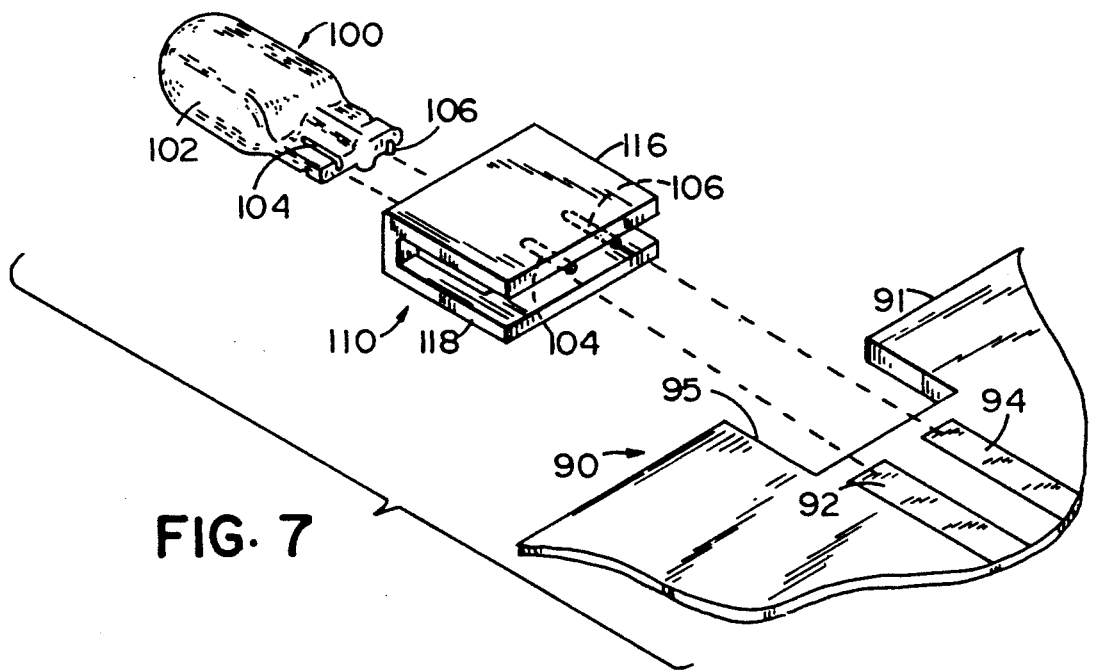
FIG. 7 is an enlarged fragmentary perspective exploded view of an alternative structure for mounting a bulb to a substrate embodying a circuit of the present invention.

In an alternative embodiment of the bulb mounting structure, instead of mounting the bulb to the illuminated vanity mirror package 50 and subsequently contacting the visor electrical circuit upon assembly of the vanity mirror to the visor, the bulbs can be mounted directly to the circuit formed in the visor body in a manner shown in FIGS. 7 and 8. Referring now to FIG. 7, there is shown an alternative visor core substrate material 90 which can be one of the visor panels such as panel 22 shown in the first embodiment. Visor core section 90 is thus made of a suitable insulative substrate such as a polymeric material or fiberboard member on which there is bonded a pair of conductive strips 92 and 94 which can be configured to extend across the visor panel for providing electrical operating power to the bulbs at opposite ends of panel 90 and which can couple to a switch similar to the switch defined by contact arm 65 in the first embodiment. A wedge base bulb 100 is mounted to the edge of substrate 90 and in contact with the ends of electrical conductors 92 and 94 by means of a housing 110.

The wedge-type bulb includes a bulb envelope 102 with a pair of electrical leads 104 and 106 extending outwardly therefrom in a standard base configuration. The bulb is inserted through a configured aperture 112 in the end 114 of the generally U-shaped housing 110 having an upper and lower leg 116 and 118 respectively with the leads 104 and 106 extended between legs 116 and 118 and extending around the top leg 116 as illustrated in FIG. 7 in schematic form. The bulb and housing combination is then pressed fit within a slot 95 formed in the edge of substrate 90 adjacent the ends of conductors 92 and 94 with legs 116 and 118 being spaced to provide a tight compressive engagement of leads 104 and 106 with conductors 92 and 94 when so assembled. This construction provides a mechanical and electrical interconnection of a relatively inexpensive bulb to an edge of the visor body substrate material and positioned, as in the earlier embodiment, in alignment behind the pair of lenses for supplying illumination for the illuminated vanity mirror package. Naturally, edge 91 of substrate 90 when forming a visor body is not the outer edge but only the edge of a bulb receiving opening of the visor body. It will become apparent to those skilled in the art that various modifications to the preferred embodiment of the invention as described herein can be made without departing from the spirit of scope thereof as defined by the appended claims.

The embodiments of the invention in which an exclusive property or privelege is claimed are defined as follows:

1. A visor including an electrical accessory mounted thereto, said visor comprising:
   a substrate formed in the shape of a visor body, said substrate including a layer made of an electrically insulating material and a layer of conductive material attached to said insulating material, said conductive material defining an electrical circuit on a surface of said insulating layer which is located within a visor formed by said body;
   an electrical accessory mounted to said visor body and including contact means which electrically engage said circuit of said substrate for receiving at least operating power therefrom; and
   means for supplying electrical operating power to said electrical circuit, wherein said body is defined by a folded core of said substrate and wherein said circuit is positioned on an inner surface of said body when said core is folded to define said visor body.

2. The apparatus as defined in claim 1 wherein said electrical accessory comprises an illuminated vanity mirror package.

3. The apparatus as defined in claim 2 wherein said vanity mirror package includes at least one lamp mounted to said package in a position to engage said electrical circuit when said package is mounted to said visor body.

4. The apparatus as defined in claim 3 wherein said means for supplying operating power to said electrical circuit includes switch means.

5. The apparatus as defined in claim 4 wherein said package includes a mirror frame for holding said mirror and a cover pivotally mounted to said frame for selectively covering said mirror, and wherein said switch means cooperates with said cover for supplying operating power to said lamps only when said cover is in an open position.

6. The apparatus as defined in claim 5 wherein said electrical oirouit comprises at least a pair of conductors and wherein said switch means comprise a conductive spring arm having one end mounted to said insulating material and to means for supplying operating power, and an opposite end which is positioned in spaced alignment with one of said conductors, and wherein said spring arm is moved for engaging said conductor to supply operating power to said lamp in response to the movement of said cover to an open position exposing said mirror.

7. The apparatus as defined in claim 6 wherein said package includes a pair of spaced lamps located on opposite sides of a mirror mounted within said package and wherein said electrical circuit defines a pair of spaced terminal pairs located in alignment with said lamps for supplying electrical operating power to said lamps.

8. The apparatus as defined in claim 7 wherein said insulating material is fiberboard.

9. A visor including an electrical accessory mounted thereto, said visor comprising:
   a substrate formed in the shape of a visor body, said substrate including a layer made of an electrically insulating material and a layer of conductive material attached to said insulating material and defining a pair of electrical conductors on a surface of said insulating layer;
   a vanity mirror package including at least one lamp mounted to said package in a position to engage said electrical conductors when said package is mounted to said visor body;
   means for mounting said package to said visor body; and
   means for supplying electrical operating power to said electrical conductors.

10. The apparatus as defined in claim 9 wherein said means for supplying operating power to said electrical conductors includes switch means.

11. A visor including an electrical accessory mounted thereto, said visor comprising:
    a substrate formed in the shape of a visor body, said substrate including a layer made of an electrically insulating material and a layer of conductive material attached to said insulating material and defining a pair of electrical conductors on a surface of said insulating layer;
    a vanity mirror package including at least one lamp mounted to said package in a position to engage said electrical conductors when said package is mounted to said visor body;
    means for mounting said package to said visor body; and
    means for supplying electrical operating power to said electrical conductors, wherein said means for supplying operating power to said electrical conductors includes switch means comprising a conductive spring arm having one end mounted to said insulating material and to means for supplying operating power and an opposite end positioned in spaced alignment with one of said conductors, and wherein said spring arm is moved for engaging said conductor to supply operating power to said lamp in response to the movement of a cover of said vanity mirror package to an open position exposing a mirror.

12. The apparatus as defined in claim 11 wherein said means for supplying operating power to said electrical circuit includes switch means.

13. A visor including an electrical accessory mounted thereto, said visor comprising:
- a substrate formed in the shape of a visor body, said substrate including layer made of an electrically insulating material and a layer of conductive material attached to said insulating material and defining a pair of electrical conductors on a surface of said insulating layer;
- a vanity mirror package including at least one lamp mounted to said package in a position to engage said electrical conductors when said package is mounted to said visor body;
- means for mounting said package to said visor body, wherein said means for mounting said package to said body comprises a plurality of spaced keyhole-shaped apertures formed in one of said body and package and a plurality of aligned posts extending from the other of said body and package such that said package is mounted to said body by insertion and translation of said package with respect to said body; and
- means for supplying electrical operating power to said electrical conductors.

14. A vehicle member including an electrical accessory mounted thereto, said member comprising:
- a substrate formed in the shape of a vehicle interior member, said substrate including a layer made of an electrically insulating material and a layer of conductive material integrally attached to said insulating material, said conductive material defining at least a pair of electrical conductors on a interior surface of said member;
- an electrical accessory and means for mounting said accessory to said member and including contact means which electrically engage said conductors of said substrate for receiving at least operating power therefrom wherein said means for mounting said accessory to said member comprises a plurality of spaced keyhole-shaped apertures formed in one of said member and accessory and a plurality of aligned posts extending from the other of said member and accessory such that said accessory is mounted to said member by insertion and translation of said accessory with respect to said member; and
- means for supplying electrical operating power to said electrical circuit.

15. A vehicle accessory comprising:
- a substrate of insulative material shaped in the form of a vehicle accessory, said substrate including a pair of integral conductors extending at least to an edge of said substrate on one side thereof;
- a bulb housing having a generally U-shape with a pair of spaced walls for compressibly engaging opposite sides of said substrate; and
- a bulb including electrical leads extending therefrom for extending into said housing for engagement between said housing and said conductors of said substrate when said housing is mounted thereto for receiving operating power for said bulb from said conductors.

* * * * *

UNITED STATES PATENT AND TRADEMARK OFFICE
CERTIFICATE OF CORRECTION

PATENT NO. : 5,205,635
DATED : April 27, 1993
INVENTOR(S) : Van Order et al.

It is certified that error appears in the above-identified patent and that said Letters Patent is hereby corrected as shown below:

Col. 4, line 10, "out" should be --cut--.
Col. 6, line 13, after "bulbs" insert --which--.
Col. 7, line 29, "of" should be --or--.

CLAIMS
Col. 8, line 4, "oirouit" should be --circuit--.
Col. 10, line 1, " a " should be --an--.

Signed and Sealed this

Twenty-ninth Day of November, 1994

Attest:

BRUCE LEHMAN

*Attesting Officer*  *Commissioner of Patents and Trademarks*